Figure 6:
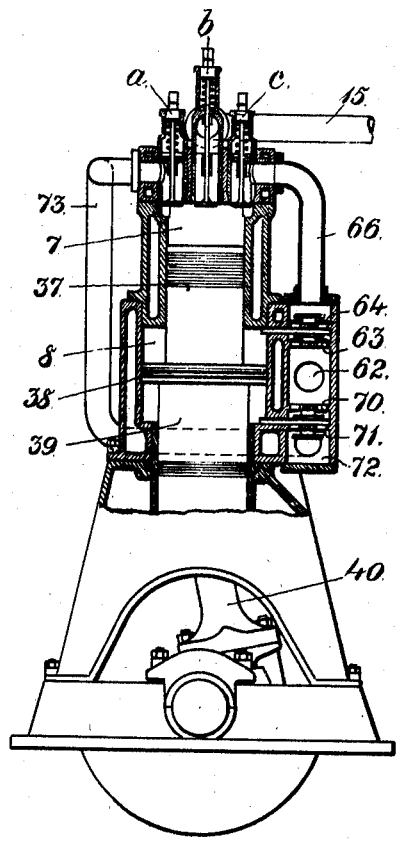

Nov. 25, 1930.  J. E. JOHANSSON  1,783,018
GAS GENERATING COMBUSTION ENGINE
Filed Oct. 12, 1925  2 Sheets-Sheet 1
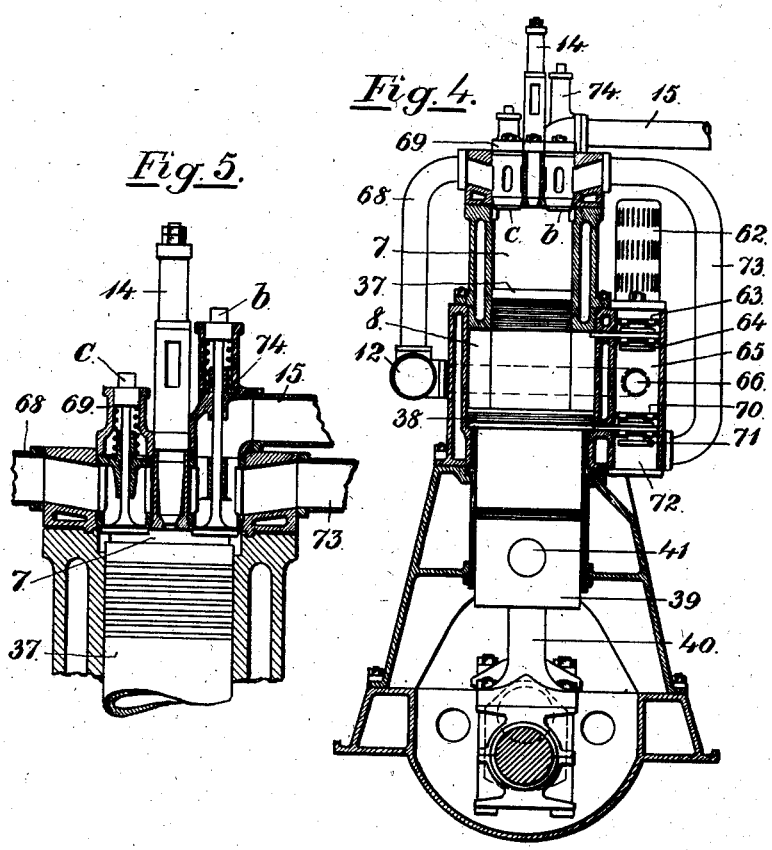

Nov. 25, 1930.  J. E. JOHANSSON  1,783,018
GAS GENERATING COMBUSTION ENGINE
Filed Oct. 12, 1925  2 Sheets-Sheet 2

Inventor,
Johan Erik Johansson
By Brown, Boettcher, Dienner
Attys.

Patented Nov. 25, 1930

1,783,018

UNITED STATES PATENT OFFICE

JOHAN ERIK JOHANSSON, OF GOTTENBORG, SWEDEN, ASSIGNOR TO AKTIEBOLAGET GOTAVERKEN, OF GOTTENBORG, SWEDEN, A CORPORATION OF SWEDEN

GAS-GENERATING COMBUSTION ENGINE

Application filed October 12, 1925, Serial No. 61,898, and in Sweden October 22, 1924.

My invention relates to generator plants for producing gas to be conveyed through pipes to and utilized in other engines at a distance from the plant.

The object of the invention is to obtain a gas mixture of suitable temperature and sufficiently high pressure that can economically be conveyed through metal pipes to be utilized for generating power with minimum loss of energy. My improved plant consists of an internal combustion four stroke piston engine and an air compressor driven by the engine, and I used air exclusively as the cooling medium. The plant is so designed that the pressure at which the expansion is interrupted in the combustion engine is approximately the same as the pressure to which the air is compressed in the compressor, the compressor having such a size as compared to the size of the combustion engine that the total volume of sucked in air is at least 50% larger than the volume part of said air of the same pressure, which is used for charging the combustion engine.

Referring to the drawings, Figure 1 is a diagram for the combustion engine, Figure 2 is a diagram for the compressor under one condition of operation, Figure 3 is a diagram for the compressor under another condition of operation, Figure 4 shows a four-stroke generator in cross section, Figure 5 shows part of the same generator on an enlarged scale, and Figure 6 shows another embodiment of the invention.

The line 48—49 in Fig. 1 is the compression curve in the combustion cylinder, the line 49—50 the combustion curve, 50—51 the expansion curve, 51—52 the exhaust line and lastly 52—53—48 the sucking-in-line. The pressure $p$, at which the exhaust takes place and which nearly corresponds to the pressure of the generated gas mixture, is higher than the sucking-in pressure $p_2$, and this last mentioned pressure in its turn is preferably higher than the atmospheric pressure. In the embodiment considered two compressors are thus required, one of them for instance so designed (see Fig. 2) that it sucks in all the air from the atmosphere that is required for the process and compresses same to the sucking-in pressure $p_2$ of the combustion engine, and the other compressor is so designed (see Fig. 3) that it compresses that part of the air compressed in the first compressor that is not used as combustion air in the combustion engine, up to the pressure $p$, in order to mix it with and cool the exhaust gases from the combustion engine. The work developed in the combustion cylinder is represented by the diagram surface 51—54—49—50—51 reduced by the surface 48—54—52—53—48. Said work with reduction of the friction work in the combustion engine and compressor is therefore at disposal for the compression of air, two compressor diagrams being obtained, the sizes of which are determined, one for low pressure in Fig. 2 and one for high pressure in Fig. 3.

The air volume $u$ compressed by the low pressure compressor to the pressure $p_2$ thus corresponds partly to the suction volume $x$ of the combustion engine constituting that part of the air which is consumed during the combustion, and partly to the sucking-in volume $v$ of the high pressure compressor, constituting that part of the air which, after compression to the pressure $p$, will be mixed with the combustion gases. Thus U equals V plus X. The gas mixture generated thus consists of hot gases of the volume $y$ from the combustion engine and air of a lower temperature of the volume $z$ from the high pressure compressor, both of the same pressure. Thus the volume of generated gas mixture is equal to Y plus Z.

Not considering the unavoidable losses by cooling and friction I have thus transmitted all the energy of the fuel to the gas mixture for the further use in a suitable motor. If this motor consists of a piston engine it is advisable that the temperature of the gas mixture with regard to the possibility of lubricating the engine be not higher than about 750° F. Such temperature can be obtained according to my invention at a pressure of for instance 60 lbs. per square inch above atmosphere. In this case the sucked in volume U is about one and one-half times larger than the charge volume X. If the gas power is to be utilized in a turbine a somewhat higher temperature can be used and thus a correspondingly higher pressure. In this latter case U is about 50% larger than X.

Referring to Figures 4, 5 and 6, 7 is the combustion cylinder of the engine, 8 a compressor cylinder there below, 37 the working piston of the combustion engine rigidly combined with the annular compressor piston 38 and the packing piston 39, the latter being connected to piston rod 40 by means of a pin 41. The upper side of the compressor piston constitutes together with the compressor cylinder the working chamber of the low pressure compressor, while the lower side of same piston constitutes the working chamber of the high pressure compressor.

The free air is sucked in through the pipe 62 and the suction valve 63. The air compressed to the low pressure $p_2$ passes the pressure valve 64 and the space 65 and is conducted partly through the pipe 66, the receiver 12 and the pipe 68 to the valve casing 69 for the mechanically operated valve $c$ of the combustion cylinder, and partly through the suction valve 70 to the high pressure compressor, whereupon the air now compressed to the high pressure $p$ escapes through the pressure valve 71 via the space 72 and the pipe 73 to the valve casing 74, in which the mechanically operated valve $b$ is arranged, in order to be conducted to a receiver for the generated gas mixture through the pipe 15.

According to the diagram in Fig. 1 air of the low pressure flows into the combustion engine during the suction stroke from 53 to 48. The valve $c$ is therefore so operated that it is open during said period. After compression, combustion and expansion have then taken place in the combustion cylinder the gases are driven out during the exhaust stroke from 51 to 52, wherefor the exhaust valve $b$ is so operated that it is open during this period, and the gases are conducted to the place of consumption through the pipe 15. The high pressure air is thus in the shown embodiment conducted through the valve casing 74 for the cooling of the valve $b$. The air will in this case not be mixed with the exhaust gases before it has entered the pipe 15 during the last part of the compression-stroke on the lower side of the piston, which occurs both immediately before the driving out of the gases through the valve $b$ and after a short interval during the last part of the suction stroke of the combustion engine. On this account the valve casing 74 can be designed smaller than if the compressed air had to be conducted therethrough simultaneously with the gases. Thus it is evident that it will be advantageous that the high compression occurs on the lower side of the piston.

The shown arrangement makes it possible to provide only two valves $b$ and $c$ of ordinary dimensions in the cylinder cover except the usual fuel valve 14, thereby allowing the cover to be cooled in the same manner as in a common four-stroke motor.

The mixture between air and exhaust gases can also take place in the combustion chamber as shown in Fig. 6. In such case however an additional valve $a$ will be necessary and then be connected to the pipe 73. Said valve can be designed with smaller passage than the valves $b$ and $c$ in Fig. 4, but the passage of the valve $b$ must be increased correspondingly. This causes however the cooling of the cover to become insufficient and therefore the design of Fig. 6 to be inferior to that of Fig. 4.

While I have described the compressor to compress the air for the gas mixture in two stages, it will be understood that the invention disclosed can be equally well applied to a double-acting compressor as shown in Fig. 6, which compresses the air for the gas mixture directly from atmosphere in one stage up to the pressure $p$ on the lower side of the compressor piston for instance, which air is conducted to the valve $a$, while the upper side of said piston is exclusively used for compressing the suction air necessary for the combustion up to the pressure $p_2$ which air is conducted to the valve $c$.

I claim:

1. In combination, in an internal combustion engine and compressor, a combustion cylinder, a compressor cylinder, and a packing cylinder disposed in coaxial relation, a compound piston structure comprising pistons having a working fit with the respective cylinders, means for admitting air to the compressor cylinder above the piston therein during the suction stroke of the engine, means for admitting a part of the air compressed during the compression stroke into the engine cylinder and for admitting the remainder of such compressed air into the compressor cylinder below the piston therein, a take-off pipe leading from the exhaust engine valve, and means for conducting the air compressed in the compressor cylinder during the out stroke of the piston over the exhaust valve and into said pipe.

2. In combination, an internal combustion engine, an air compressor working in synchronism with the engine and having a low pressure side and a high pressure side, the low pressure side of the compressor having its intake connected to atmosphere and the volume of air drawn into the low pressure side of the compressor during its suction stroke being approximately fifty per cent greater than the volume of charging air required for the engine, means for conducting a charging portion of the air compressed in the low pressure side of the compressor into the engine cylinder during the compression stroke thereof and for conducting the remainder of such compressed air to the intake of the high pressure side of the compressor, a take-off pipe leading from the exhaust valve of the engine, and means for conducting the air compressed in the high pressure side of the compressor over the exhaust valve and to said pipe.

3. In combination, an internal combustion engine, an air compressor working in synchronism with the engine and having a low pressure side and a high pressure side, the low pressure side of the compressor having its intake connected to atmosphere and the volume of air drawn into the low pressure side of the compressor during its suction stroke being approximately fifty per cent greater than the volume of charging air required for the engine, means for conducting a charging portion of the air compressed in the low pressure side of the compressor into the engine cylinder during the compression stroke thereof and for conducting the remainder of such compressed air to the intake of the high pressure side of the compressor, a take-off pipe leading from the exhaust valve of the engine, and means for conducting the air compressed in the high pressure side of the compressor over the exhaust valve and to said pipe during the combustion stroke of the engine.

4. In combination, in an internal combustion engine and compressor, a combustion cylinder, a compressor cylinder, and a packing cylinder disposed in coaxial relation, a compound piston structure comprising pistons having a working fit with the respective cylinders, means for admitting air to the compressor cylinder above the piston therein during the suction stroke of the engine, the volume of air drawn into the compressor being approximately fifty per cent greater than the volume of air required to charge the engine, means for admitting a charging portion of the air compressed during the compression stroke into the engine cylinder and for admitting the remainder of such compressed air into the compressor cylinder below the piston therein, a take-off pipe leading from the engine exhaust valve, and means for conducting the air compressed in the compressor cylinder during the out stroke of the piston over the exhaust valve and into said pipe.

In testimony whereof he affixes his signature.

JOHAN ERIK JOHANSSON.